(12) United States Patent
Lundsgaard et al.

(10) Patent No.: US 8,654,741 B2
(45) Date of Patent: Feb. 18, 2014

(54) SELECTION OF A PREPARED ACCESS POINT FROM AMONG A PLURALITY OF ACCESS POINTS

(75) Inventors: Soren K. Lundsgaard, Inverness, IL (US); Mohsin S. Bhally, Glendale Heights, IL (US); Giuseppe Mario Di Prizio, Chicago, IL (US); Tom Lee, Springdale, AR (US)

(73) Assignee: Motorola Solutions, Inc., Schaumburg, IL (US)

( * ) Notice: Subject to any disclaimer, the term of this patent is extended or adjusted under 35 U.S.C. 154(b) by 665 days.

(21) Appl. No.: 12/715,725

(22) Filed: Mar. 2, 2010

(65) Prior Publication Data

US 2011/0216692 A1 Sep. 8, 2011

(51) Int. Cl.
*H04W 4/00* (2009.01)

(52) U.S. Cl.
USPC .......................................... 370/332; 455/450

(58) Field of Classification Search
USPC .................................. 370/328, 329, 331, 332
See application file for complete search history.

(56) References Cited

U.S. PATENT DOCUMENTS

| 7,103,024 | B2 | 9/2006 | Wilson |
| 7,203,494 | B2 | 4/2007 | Flondro et al. |
| 8,089,939 | B1 * | 1/2012 | Mater et al. ................... 370/332 |
| 2008/0102845 | A1 * | 5/2008 | Zhao ............................ 455/450 |
| 2010/0054179 | A1 * | 3/2010 | Meyer ........................... 370/328 |

FOREIGN PATENT DOCUMENTS

| EP | 2056639 A2 | 5/2009 |
| EP | 2077690 A2 | 7/2009 |
| WO | 2009064931 A1 | 5/2009 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)," 3GPP TS 36.304 V8.1.0,, vol. 36.304, No. V8.1.0, Mar. 2008, pp. 30, XP002547669, section 5.2 Cell selection and reselection.
International Search Report and Written Opinion for counterpart International Patent Application No. PCT/US2010/060180 mailed on Mar. 14, 2011.

* cited by examiner

*Primary Examiner* — Kevin C Harper
*Assistant Examiner* — Henry Baron

(57) ABSTRACT

Techniques are provided for selecting an access point (AP) to communicate with from a plurality of candidate access points (APs) when a wireless communication device (WCD) roams in a wireless local area network (WLAN). The WCD can determine whether a particular link quality metric (e.g., a signal strength indicator value) of a particular preferred access point (that has the highest link quality metric) is greater than an upper threshold. If so, the WCD can then create a preferred candidate list that comprises only preferred access points, and determine whether a current serving access point of the wireless communication device is a preferred access point. If the current serving access point is not a preferred access point, the WCD can initiate a roam to the particular preferred access point that has the strongest link quality metric.

18 Claims, 9 Drawing Sheets

|  | RSSI | CHANNEL NUMBER | ADD TO APPROPRIATE CANDIDATE LIST? |
|---|---|---|---|
| HIGH FREQUENCY AP1 (150-1) | -68 | 44 | YES |
| LOW FREQUENCY AP2 (154-1) | -72 | 11 | YES |
| HIGH FREQUENCY AP3 (150-2) | -73 | 36 | YES |
| HIGH FREQUENCY AP4 (150-6) | -75 | 40 | YES |
| HIGH FREQUENCY AP5 (150-5) | -76 | 44 | YES |
| LOW FREQUENCY AP6 (154-2) | -77 | 1 | NO |
| HIGH FREQUENCY AP7 (150-4) | -78 | 48 | YES |

TABLE 1

*FIG. 6*

|  | PREFERRED BAND CANDIDATE LIST | |
|---|---|---|
|  | RSSI | CHANNEL NUMBER |
| HIGH FREQUENCY AP1 (150-1) | -73 | 44 |
| HIGH FREQUENCY AP3 (150-2) | -74 | 36 |
| HIGH FREQUENCY AP4 (150-6) | -75 | 40 |
| HIGH FREQUENCY AP5 (150-5) | -76 | 44 |
| HIGH FREQUENCY AP7 (150-4) | -78 | 48 |

TABLE 2

*FIG. 7*

|  | NON-PREFERRED BAND CANDIDATE LIST | |
|---|---|---|
|  | RSSI | CHANNEL NUMBER |
| LOW FREQUENCY AP2 (154-1) | -72 | 11 |

TABLE 3

*FIG. 8*

SELECTION OF A PREPARED ACCESS POINT FROM AMONG A PLURALITY OF ACCESS POINTS

FIELD OF THE INVENTION

The present invention generally relates to network communications, and more particularly relates to techniques for selecting a preferred access point from a plurality of access points in a wireless local area network (WLAN).

BACKGROUND OF THE INVENTION

Wireless computer networks have been defined in which a wireless communication device communicates with a network via an access point.

When a wireless communication device (also referred to as a "station" or "node") wants to access a WLAN, for example after power-up, sleep mode, or moving to a new area, the wireless communication device searches for access points (APs) by scanning. The IEEE 802.11 standard defines both passive and active scanning. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein are incorporated by reference in their entirety and may be obtained by contacting the IEEE at IEEE, 445 Hoes Lane, PO Box 1331, Piscataway, N.J. 08855-1331, USA.

In passive scanning, the wireless communication device scans individual channels for beacon frames that are periodically transmitted by the AP. The beacon frame includes synchronization information, and other information about the access point including service set identifier (SSID), supported data rates, etc.

Active scanning is optional, and differs from passive scanning in that the wireless communication device tries to locate access points and initiates the scanning process by broadcasting a probe request frame. Active scanning enables a wireless communication device to receive immediate response from access points, without waiting for transmission of a beacon frame. A probe request frame may include an SSID, or can have a null SSID or can include a destination address of a specific AP. When the probe request frame includes an SSID, all APs with a matching SSID that receive the probe request frame will respond by transmitting a probe response frame. When the probe request frame includes a null SSID, all APs that receive the probe request frame will respond by transmitting a probe response frame. When the probe request frame includes a destination address of a specific AP, only the AP indicated by the destination address will transmit a probe response that will be heard by the wireless communication device.

When the wireless communication device receives a beacon frame it can record information associated with the beacon frame (e.g., corresponding power level and received signal strength) and subsequently use this information to select which access point to communicate through. At the conclusion of the scanning, the wireless communication device (WCD) generates a scan report that includes parameters for each of the APs that were detected during scanning. For each AP detected the scan report can include a number of parameters.

When an authentication process is complete and the wireless communication device is authenticated with the AP, the wireless communication device must associate with the access point before sending data frames. The association process involves the exchange of information about capabilities of the wireless communication device and the AP. Association is necessary to synchronize the wireless communication device and access point with important information, such as supported data rates. The wireless communication device initiates the association by sending an association request frame containing elements such as SSID and supported data rates. The access point responds by sending an association response frame containing an association ID along with other information regarding the access point. Once the wireless communication device and access point complete the association process, they can send data frames to each other.

When the wireless communication device moves about the wireless network or "roams," the wireless communication device can often benefit from associating with and communicating through a different access point even though the wireless communication device is still within communication range of its current serving access point that it is currently associated with. To decide which AP the wireless communication device should join (or "roam to") and authenticate and associate with as the wireless communication device moves about the network, the wireless communication device implements an AP selection or "roaming algorithm" to make this decision. The IEEE 802.11 standards do not specify a standard roaming algorithm. Instead, the AP selection or roaming algorithms are left to the discretion of the wireless communication device vendor and are thus usually vendor specific. Many AP selection or roaming algorithms rank APs using one or more performance metrics, such as a Received Signal Strength Indicator (RSSI) that reflects signal strength of a beacon frame received from the AP, and then select the highest ranked AP as the AP to roam to.

Accordingly, it is desirable to provide improved AP selection techniques for use by a wireless communication device as the wireless communication device encounters different APs when moving from one physical location to another in a network. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

FIGS. 6-8 illustrate non-limiting examples of an overall candidate list (OCL), a preferred candidate list (PCL), and a non-preferred side candidate list (NPSCL), respectively.

DETAILED DESCRIPTION OF THE INVENTION

The following detailed description of the invention is merely illustrative in nature and is not intended to limit the invention or the application and uses of the invention. Furthermore, there is no intention to be bound by any theory presented in the preceding background of the invention or the following detailed description of the invention.

Illustrative Network

Figure 1:
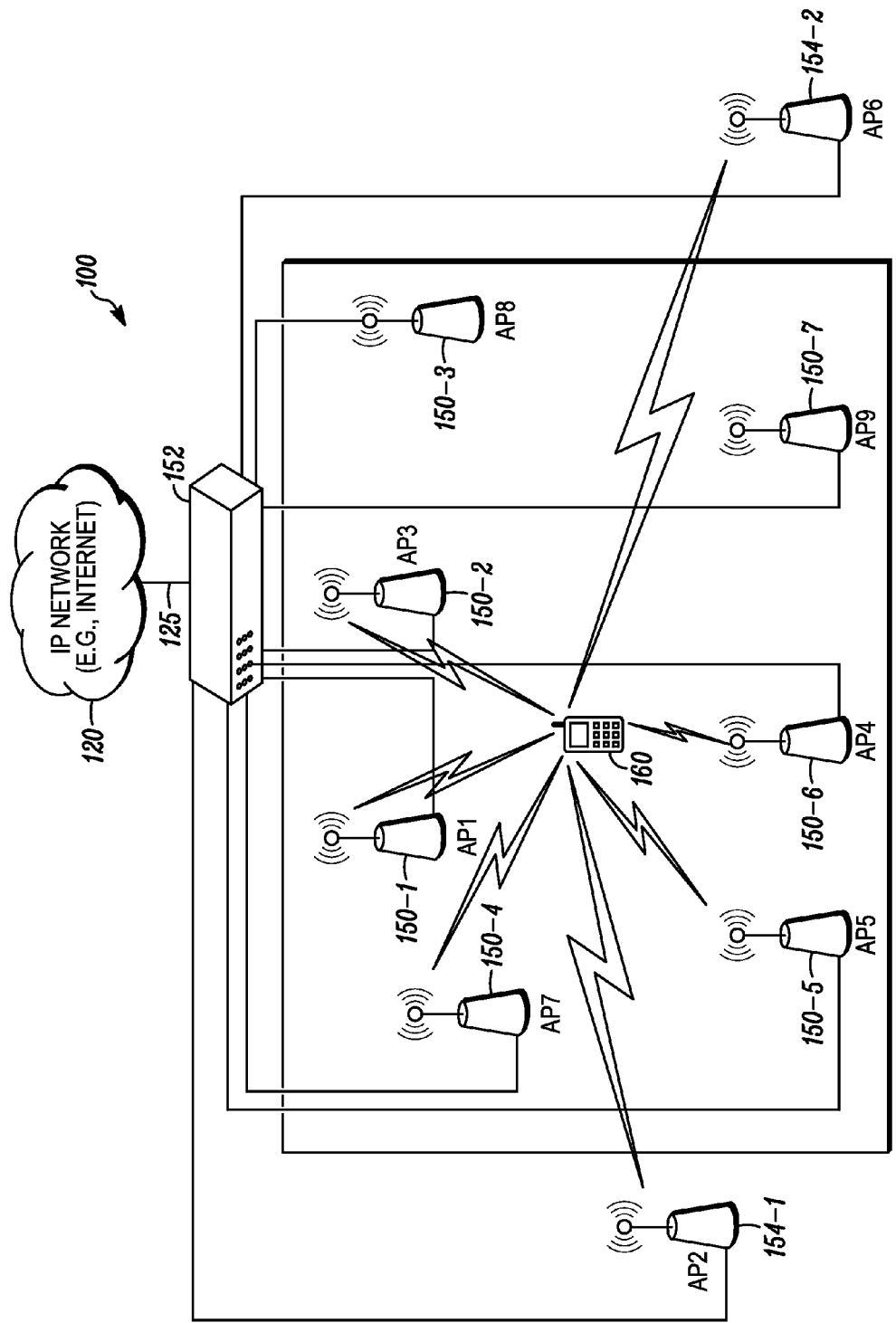
FIG. 1 illustrates an example of a wireless local area network (WLAN)

FIG. 1 illustrates an example of a wireless local area network (WLAN) 100 which includes an Internet Protocol (IP) network 120, an optional wireless switch 152, access points 150-1 . . . 150-7, 154-1, 154-2, and a wireless communication device 160. A link 125 couples the wireless switch 152 (e.g., via a router that is not shown) to the IP network 120 which may comprise, for example, the Internet or an intranet.

As used herein, the term "wireless communication device" refers to any portable computer or other hardware designed to communicate with an infrastructure device of an access network over an air interface through a wireless channel. In many cases such wireless communication devices are "handheld" and potentially mobile or "nomadic" meaning that the wireless communication device 160 can physically move around the WLAN 100, but at any given time may be mobile or stationary and can include devices that communicate through a wireless channel. The wireless communication device 160 can be one of any of a number of types of mobile computing devices, which include without limitation, mobile stations (e.g., mobile telephone handsets, mobile radios, mobile computers, hand-held or laptop devices and personal computers, a personal computer (PC) card, personal digital assistants (PDAs), or the like), access terminals, subscriber stations, user equipment, compact flash, external or internal modem, or any other devices configured to communicate via wireless communications. Although not illustrated, each AP can serve multiple wireless client devices within a defined network area. It will be appreciated by those skilled in the art that although FIG. 1 shows an example network configuration in which one wireless communication device 160 is present, in many cases many wireless communication devices can be configured as part of the WLAN 100 at any given time. The wireless communication device 160 can communicate with the APs 150-1 . . . 150-7, 154-1, 154-2 in accordance with any known communication standards such as those based on IEEE 802.11 (e.g., 802.11a, 802.11b, 802.11g, 802.11n or 802.11s). As will be described below, the wireless communication device 160 can authenticate and associate with any of the access points 154 (or alternatively access ports).

The access points 150-1 . . . 150-7, 154-1, 154-2 are devices that enable the wireless communication device 160 to connect to and communicate with the WLAN 100. The access points 150-1 . . . 150-7, 154-1, 154-2 can relay data between the wireless communication devices and wired computing devices on the WLAN 100. The AP directly serves as the point of interconnection between the WLAN and the fixed wired network and allows wireless communication devices to be quickly and easily connected to a wired LAN. In general, an access point is a network-capable device containing a transceiver and antenna for transmitting signals to and receiving signals from the remote client devices or stations. Although only nine APs 150-1 . . . 150-7, 154-1, 154-2 are illustrated in FIG. 1, a conventional WLAN 100 can include any number of such access points.

In the embodiment illustrated in FIG. 1, the access points 154 are illustrated as being coupled to a wireless switch 152. It will be appreciated by those of ordinary skill in the art that the wireless switch 152 is optional and can be implemented in some, but not all, network architectures. When a wireless switch 152 is implemented, instead of access points, simplified access ports can be used in conjunction with a wireless switch 152. These access ports, sometimes referred to as thin access points, have reduced Media Access Control (MAC) functionality in comparison to regular or "fat" access points that have full MAC functionality, and many of the higher level MAC functions that would normally be implemented in an access point are implemented at the wireless switch device instead. The wireless switch 152 serves as a master controller that provides a single point of administration for all access ports it controls. Among other things, a wireless switch 152 configures, controls, manages, and secures the environment for one or more access ports connected to it. In wireless switch/access port architecture, the wireless protocol terminates at the wireless switch. Although not illustrated, the wireless switch 152 typically includes at least one processing unit, memory and wired Ethernet interfaces for a plurality of access ports it supports. In contrast to an access point based network architecture where the access point serves as the termination point for the wireless protocol, in a wireless switch based network architecture, the wireless switch 152 serves as a termination point for a "wireless" protocol, such as the IEEE 802.11 protocol. To explain further, the wireless communication device 160 communicates with an AP 154 over the air via wireless packets (e.g., IEEE 802.11 data packets), and the AP passes the wireless packets to the wireless switch over a wire that connects the wireless switch and the AP 154. In other words, the wireless switch 152 communicates wireless packets encapsulated in wired packets (e.g., IEEE 802.11 packets encapsulated in IEEE 802.3 packets) with the AP 154. The wireless switch 152 receives data packets, going to or received from one of its connected access ports 154, and processes those data packets, which would have traditionally been processed by a "thick" access point. A packet forwarding module of a wireless switch device forwards those data packets based on information contained in their Layer 2 (L2) headers, which for a wireless switch are headers corresponding to L2 wireless networking protocols including IEEE 802.11, etc. For instance, in the context of IEEE 802.11 networks, a wireless switch 154 decapsulates inbound IEEE 802.11 data packets received from client device via an access port into IEEE 802.3 packets, and converts/encapsulates outbound IEEE 802.3 packets destined for a client device into IEEE 802.11 data packets before passing them on to an AP for transmission to the wireless communication device 160. The wireless switch then Layer-2 switches the resulting 802.3 packet onto the wired link 125. If the 802.3 packet is destined to the wireless switch itself, then the wireless switch routes the IP packet based on its "routing table." In addition to Layer 2 (L2) switching and Layer 3 (L3) or IP routing of data packets, a wireless switch (WS) also performs a number of additional services/functions.

Figure 2:
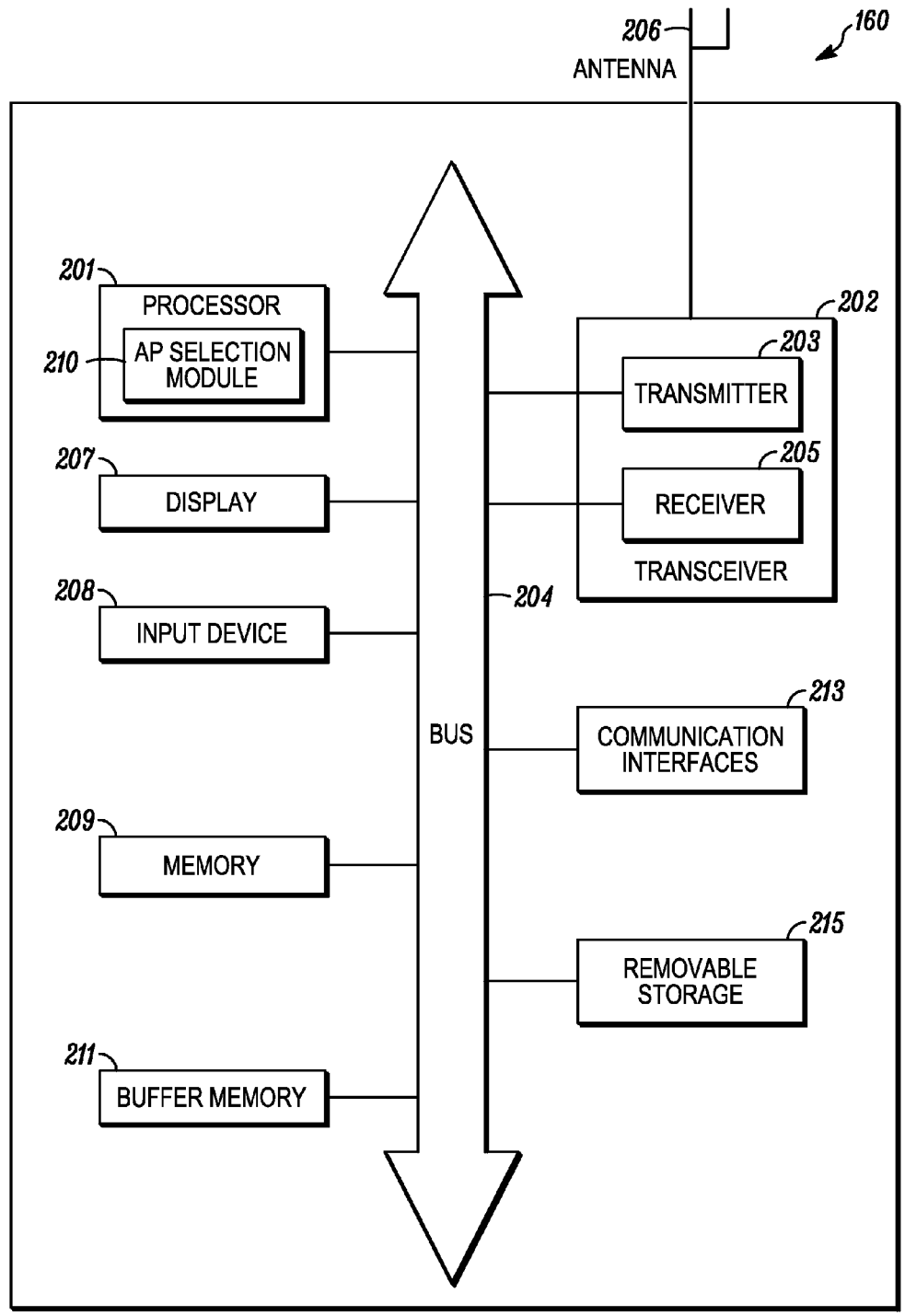
FIG. 2 is a block diagram of a wireless communication device.

FIG. 2 is a block diagram of a wireless communication device 160. The wireless communication device 160 comprises a processor 201, a transceiver 202 including a transmitter circuitry 203 and a receiver circuitry 205, an antenna 206, a display 207, an input device 208, a memory 209 for storing operating instructions that are executed by the processor 201, a buffer memory 211, one or more communication interfaces 213, and a removable storage unit 215. Although not shown, the wireless communication device 160 also can include an antenna switch, duplexer, circulator, or other highly isolative means (not shown) for intermittently providing information packets from the transmitter circuitry 203 to the antenna 206 and from the antenna 206 to the receiver circuitry 205. The wireless communication device 160 can be an integrated unit containing at least all the elements depicted in FIG. 2, as well as any other elements necessary for the wireless communication device 160 to perform its particular functions. Alternatively, the wireless communication device 160 may comprise a collection of appropriately interconnected units or devices, wherein such units or devices perform functions that are equivalent to the functions performed by the elements of the wireless communication device 160. For example, the wireless communication device 160 may comprise a laptop computer and a wireless LAN (local area network) card.

The processor 201 can include one or more microprocessors, microcontrollers, DSPs (digital signal processors), state machines, logic circuitry, or any other device or devices that process information based on operational or programming instructions. Such operational or programming instructions can be, for example, stored in the memory 209. As will be described in greater detail below, the processor 201 can include an AP selection module 210 that is used to perform processing associated with AP selection methods that will be described below with reference to FIGS. 3-9.

The memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. Although not illustrated in FIG. 2, the wireless communication device 160 maintains lists of candidate APs in its known AP database (KAPDB). These lists can be stored in the memory 209. The various candidate lists (CLs) specify APs that are candidates to be serving APs for the wireless communication device 160. In general, candidate APs include all APs detected during scanning and can also include APs that are in the KAPDB that were not detected during the most recent scan. Each candidate AP has a service set identifier (SSID) that specifies a name that identifies the WLAN that the wireless communication device 160 wants to attach to. Multiple APs can share the same SSID if they provide access to the same WLAN. The KAPDB includes an entry for each known AP that the wireless communication device 160 has detected when scanning for APs. Each entry in the KAPDB also includes: a basic service set (BSS) identifier (BSSID) for each AP, channel/frequency of each AP, one or more AP statistics for each AP including signal strength indicators, such as RSSI, associated with each AP (described below).

AP statistics (APSs) associated with each candidate AP vary depending on the implementation. The wireless communication device 160 can measure/determine APSs based on signals received from the APs, or obtain the APSs from the APs and/or wireless switch 152 (in network architectures where a wireless switch is implemented). The AP statistics (APSs) can include any one of a number of statistics or communication performance metrics which characterize or reflect, for example, the link capacity and/or link quality of the communication link between the wireless communication device 160 and the APs. The APSs can generally include any known Link Quality Metrics (LQMs) and/or Link Capacity Metrics (LCMs). LQMs can include any metrics which reflect channel or link quality between the wireless communication device 160 and an AP. LCMs can also include any metrics which reflect channel or link capacity between the wireless communication device 160 and an AP. Examples of APSs include, but are not limited to: a received signal strength indicator (RSSI) value of a signal received from a candidate AP (e.g. a measure of the received RF power in a selected channel over the preamble of a signal received from a candidate AP), a Received Channel Power Indicator (RCPI) value (e.g., a measure of the received RF power in a selected channel over the preamble and the entire received 802.11 frame received from a candidate AP), a received sensitivity (RS) value of a signal received from a candidate AP (e.g., the lowest level signal strength at which a packet can be successfully recovered such that any packet received with a value less than a threshold RS value will be viewed as noise), a carrier-to-noise ratio (CNR) value of a signal received from a candidate AP; carrier-to-noise-and-interference ratio (CNIR) value of a signal received from a candidate AP; signal-to-noise ratio (SNR) value of a signal received from a candidate AP (usually measured in terms of $E_b/N_0$, which stands for energy per bit divided by the one-sided noise density) or an average thereof; a signal-to-interference ratio (SIRs) value of a signal received from a candidate AP (also referred to as carrier-to-interference ratio (CIR), where the SIR/CIR is the quotient between the average received modulated carrier power S or C and the average received co-channel interference power I); a signal-to-interference-plus-Noise Ratio (SINR) value of a signal received from a candidate AP; packet error rate (PER) estimate of a signal received from a candidate AP or average packet error rate (PER) estimate or the product PER×SINR or an average thereof; the number of multipath signals present during demodulation of a signal received from a candidate AP, a post-detection signal quality (PDSQ) value of a signal received from a candidate AP, an analog gain control (AGC) output value of a signal received from a candidate AP, a transmitted power level (TPL) at which the respective data packets were transmitted by the wireless communication device over the respective links to candidate APs (e.g., the power level at which the wireless communication device finds it necessary to transmit a data-packet over the link); an average of a number of retransmissions per packet (e.g., how many packets are transmitted with up to a pre-defined number of retransmissions); a percentile of the number of retransmissions per packet (e.g., how many packets are transmitted with up to a pre-defined number of retransmissions); number of missed beacon frames from each candidate AP; number of missed probe responses from each candidate AP (when the wireless communication device 160 performs active scanning); age indictors (e.g., age statistics maintained by the wireless computing device that indicate how much time has passed since a packet was received from that candidate AP by the wireless computing device); and advertised data rates supported by each candidate AP. The SIR/CIR resembles the carrier-to-noise ratio (CNR), which is the signal-to-noise ratio (SNR) of a modulated signal before demodulation.

In addition, an entry for each candidate AP comprises a candidate AP marker for the candidate AP which indicates whether the AP is a candidate for selection, and one or more AP statistics for the candidate AP. As will be described below, a plurality of different of candidate lists are defined that specify candidate APs that the wireless communication device 160 can roam to in a given scenario. In one implementation, these include an overall candidate list (OCL), a preferred candidate list (PCL), a non-preferred side candidate list (NPSCL), and a merged candidate list (MCL). Further details regarding these candidate lists are described below.

One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the wireless communication device 160 that will be described below with reference to FIGS. 3-9.

The transmitter circuitry 203 and the receiver circuitry 205 enable the wireless communication device 160 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, IEEE 802.11 WLAN interfaces, IEEE 802.16 interfaces, Worldwide Interoperability for Microwave Access (WiMax) interfaces, and the like).

The implementations of the transmitter circuitry 203 and the receiver circuitry 205 depend on the implementation of the wireless communication device 160. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the wireless communication device 160 or insertable into the wireless communication device 160 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 may be implemented in a processor or processors, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from multiple bandwidths. The receiver circuitry 205 may optionally comprise a first receiver and a second receiver, or one receiver capable of receiving in two or more bandwidths. The transceiver 202 includes at least one set of transmitter circuitry 203. The transmitter circuitry 203 may be capable of transmitting to multiple devices on multiple frequency bands. As with the receiver circuitry 205, dual transmitters 203 may optionally be employed where one transmitter is for the transmission to a proximate node or direct link establishment to WLANs and the other transmitter is for transmission to a cellular base station, for example.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the wireless communication device 160 is constructed to receive video information from a video source, the wireless communication device 160 further can include a video decoder capable of decoding the current Moving Picture Experts Group (MPEG) standard or some other video decoding standard. When the wireless communication device 160 is further capable of transmitting video information, the wireless communication device 160 further can include a video encoder capable of encoding the video data. Such video encoder and decoder can be, for example, implemented as part of the processor 201.

Overview

Referring again to FIG. 1, wireless communication device 160 can roam to, authenticate and associate with any number of access points while it is in the WLAN 100 including access points that are not illustrated in FIG. 1.

As the wireless communication device 160 moves or "roams" about the network, the quality or capacity of its communication link with each AP can change. In some cases, its communication link with its current AP will continue to be the best communication link, while in other cases its communication links with other APs can be better than its communication link with its current AP. In this case it is beneficial for the wireless communication device 160 to select a new AP and to associate and authenticate with the new AP. As such, the wireless communication device 160 regularly performs learning and/or tracking scans (either passively or actively) for APs to collect information that can be used to determine which AP offers the best communication link. The learning scan is distinguishable from a "tracking" scan. During a tacking scan the wireless communication device 160 scans only for APs that were determined to be in the OCL or the MCL. Based on the information obtained during scanning, the wireless communication device 160 can determine AP statistics (e.g., link quality metrics including received signal strength) for each AP, rank the APs, and then select a serving AP that it will communicate with based on the rankings.

It may not always be desirable to select the highest ranked AP (e.g., the AP that has the highest ranking or RSSI). In some situations, it is desirable to prefer one type of AP over another type of AP even though it has a lower ranking. For example, when multiple APs are within communication range and there are many more APs of one type, it might be preferable to select that one type of AP with a preference over another type of AP even though it has a lower ranking or RSSI. Thus, in certain conditions it is desirable to select one type of AP with a preference over other types of APs even though it has a lower ranking (e.g., select the one type of AP even though it has a lower RSSI than that of other types of APs).

In accordance with embodiments of the present invention, a wireless communication device 160 is provided that is designed to select one of a plurality of access points (APs) 154 to communicate with in a WLAN 100. The wireless communication device 160 scans for access points within communication range of a wireless communication device and records link metrics (e.g., signal strength indicator values and/or other AP statistics) for each access point that is detected during scanning in an overall candidate list. The AP statistics are one or more metrics of at least one of: link capacity of the communication link between the wireless communication device 160 and the candidate AP, and link quality of the communication link between the wireless communication device 160 and the candidate AP. The wireless communication device 160 can then select a particular one of the candidate APs as the serving AP for the wireless communication device 160. For example, in one implementation where the link metric that is recorded is a link quality metric such as a signal strength indicator value, the wireless communication device can determine whether a particular signal strength indicator value of a particular preferred access point (that has the highest signal strength indicator value) is greater than a high signal strength threshold. When the particular signal strength indicator value is determined to be less than the high signal strength threshold, the wireless communication device 160 can select a new serving access point from among all of the access points detected during scanning.

However, when the particular signal strength indicator value is determined to be greater than the high signal strength threshold, the wireless communication device 160 should enter a preferred selection mode (e.g., in which the selection of certain types of APs is preferred over others), and create a preferred candidate list that comprises only a particular type of preferred access points that are preferred for selection over other types of non-preferred access points. The wireless communication device 160 can then determine whether its current serving access point is a preferred access point, and, if not, can initiate a roam to the particular preferred access point that has the strongest signal strength indicator value.

Non-limiting examples of these techniques will now be described below with reference to FIGS. 3-9. In the examples described in FIGS. 3-9, the wireless communication device utilizes signal strength indicator values (e.g., RSSI values) as one particular link metric or criteria that is used (1) to determine whether the wireless communication device should be in a preferred AP selection mode (e.g., where it selects certain preferred APs with a preference over others), and/or (2) to determine which AP should be selected from a particular candidate list (e.g., to determine an applicable candidate list that an AP should be selected from, and then select an AP from that applicable candidate list). However, it will be appreciated that signal strength indicator values (e.g., RSSI values) are just one possible example of the particular link metric or criteria that is used to make these determinations, and that in other implementations, other link metrics (described above) can be used as criteria for these determinations.

Figure 3:
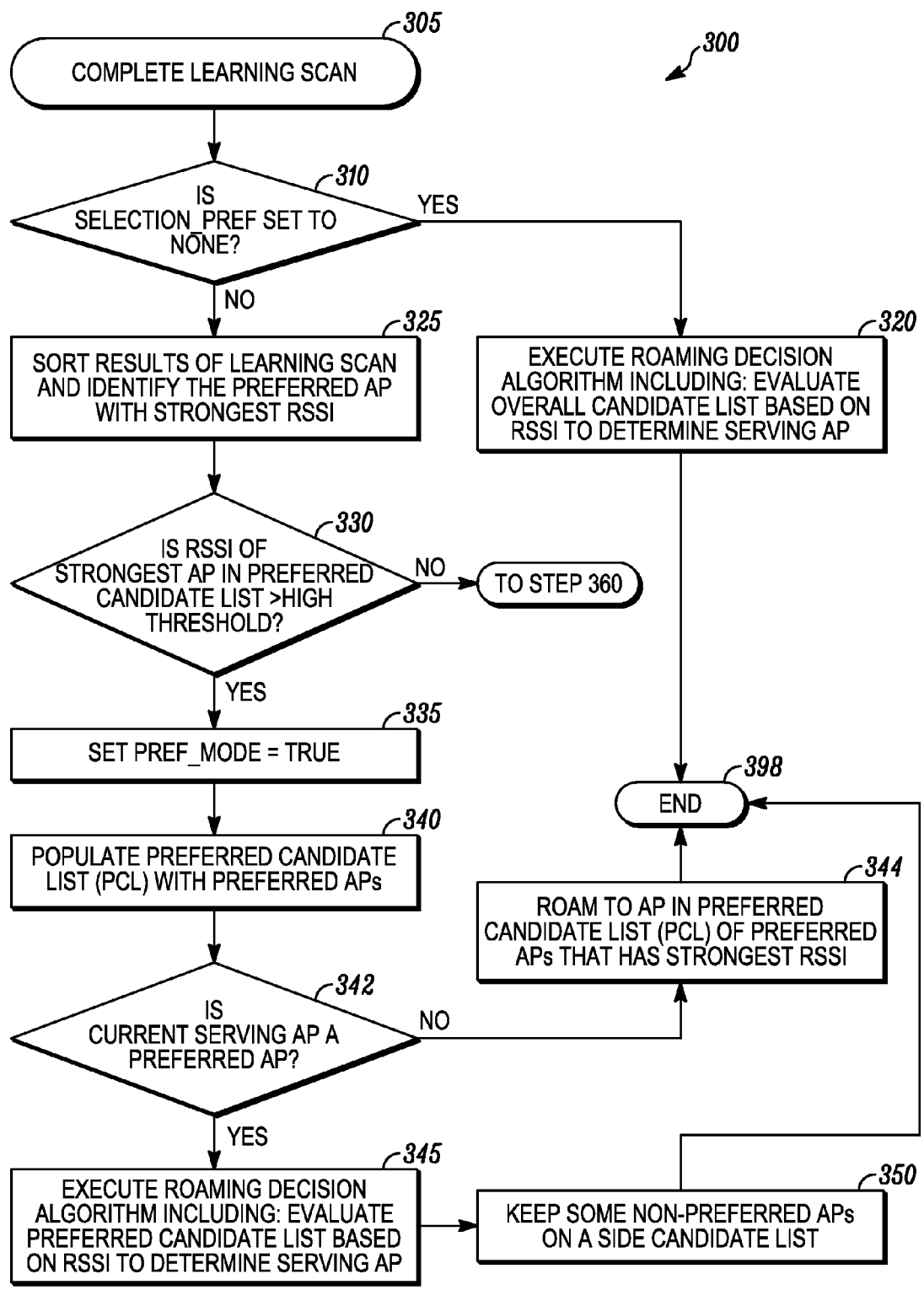
FIG. 3 is a flow chart of a method for creating candidate lists at a wireless communication device that can be used by the wireless communication device for selective roaming to a preferred access point (AP) in accordance with some of the disclosed embodiments.
Figure 3:
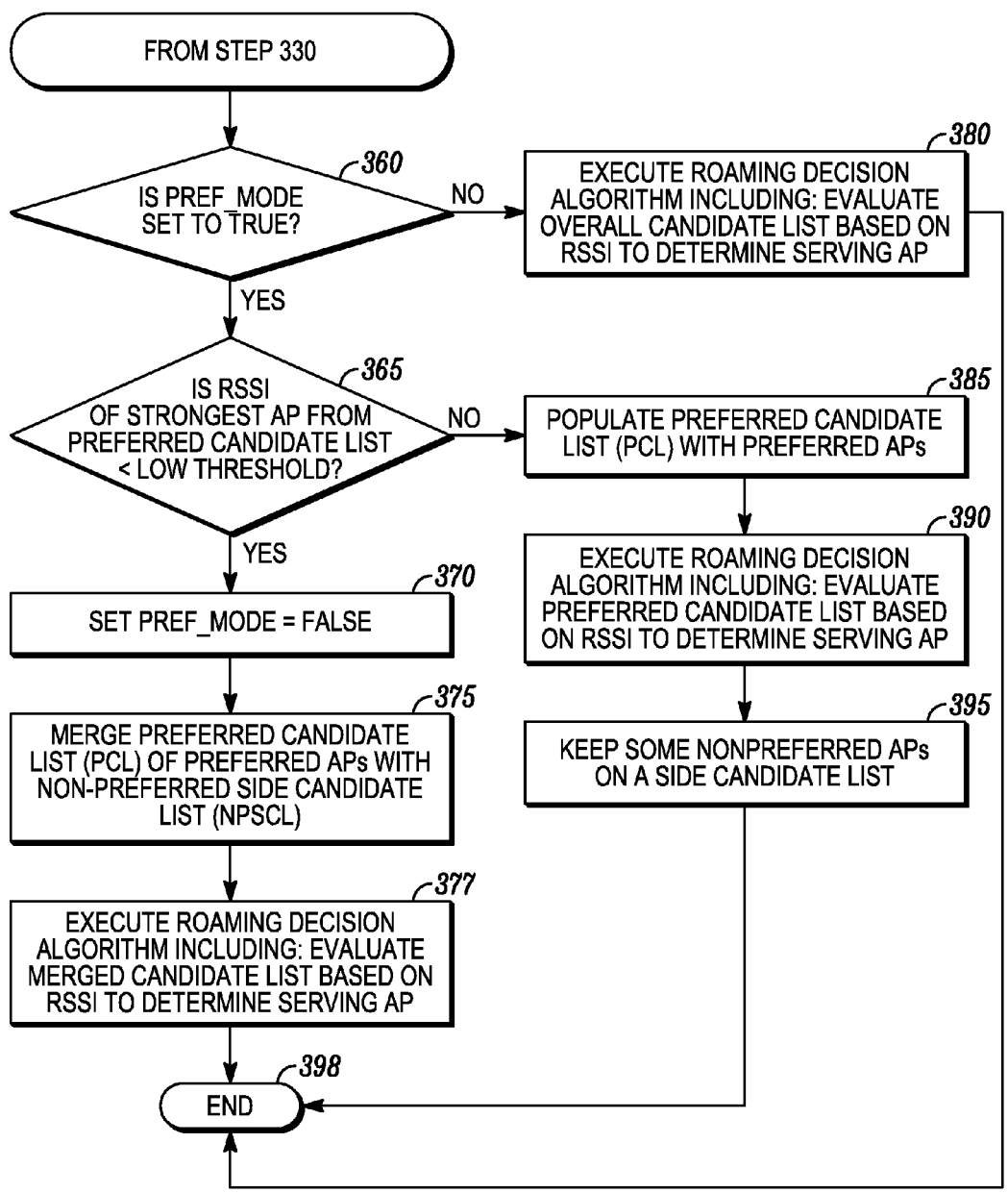

FIG. 3 is a flow chart of a method 300 for creating candidate lists at a wireless communication device 160 that can be used by the wireless communication device for selective roaming to a preferred AP in accordance with some of the disclosed embodiments. Method 300 can be implemented following a learning scan during which the wireless communication device 160 scans for all APs within communication range and records signal strength indicator values for each one. The wireless communication device 160 can use these candidate lists to decide which AP it should select as its serving AP from among a plurality of APs that are within its communication range. Method 300 will be described below with reference to the WLAN 100 illustrated in FIG. 1; however, it will be appreciated that application/implementation of method 300 is not limited to the network architecture illustrated in FIG. 1.

As will be described below, a plurality of different of candidate lists are defined that are used to specify candidate APs that the wireless communication device 160 can roam to in a given scenario. In one particular implementation, these include an overall candidate list (OCL), a preferred candidate list (PCL), a non-preferred side candidate list (NPSCL), and a merged candidate list (MCL).

The overall candidate list can include some or all of the APs detected during a scan, such as a learning scan. For example, in one implementation, the overall candidate list can include all of the APs detected during a scan, whereas in another implementation, the overall candidate list can include the APs detected during a scan that meet a pre-determined criteria (e.g., have a signal strength/signal strength indicator that is above/below a particular signal strength threshold).

The preferred candidate list (PCL) includes only "preferred" APs, and the non-preferred side candidate list (NPSCL) includes only non-preferred APs. The PCL can include either all of the preferred APs detected during a learning scan or a subset of those preferred APs. Similarly, the NPSCL can include either all of the non-preferred APs detected during a learning scan or a subset of those non-preferred APs. In one implementation that will be describe below with reference to FIG. 3, the preferred APs are those APs that communicate over a particular preferred frequency band, and the non-preferred APs are those APs that communicate over a non-preferred frequency band (e.g., APs which do not communicate using the particular preferred frequency band). This way, APs are differentiated between based on the frequency band over which they communicate. In one implementation, the preferred access points comprise a low-frequency access points, and the non-preferred access points comprise a high-frequency access points, or vice-versa. In one particular instance of this implementation, higher frequency APs (e.g., an IEEE 802.11a compliant AP that communicates over a 5.0 GHz frequency band) can be designated as preferred APs and will therefore be included in the PCL, whereas lower frequency APs (e.g., an IEEE 802.11b/g compliant AP that communicates over a 2.4 GHz frequency band) can be designated as non-preferred, and at least some of the low frequency APs (e.g., a subset thereof) can be included in the NPSCL. In such an implementation, a band selection preference setting (band_sel_pref) indicates that selection of a high frequency AP is preferred over lower frequency APs.

However, the disclosed embodiments are not limited to this implementation, and other characteristics of APs can be used to differentiate between them and give them status as preferred or non-preferred. For example, instead of using frequency band as the criteria that differentiates between preferred APs and non-preferred APs, other criteria could also be used such as modulation type used by the AP to modulate signals, data rates that the APs are capable of, and the like.

For example, in one implementation, the preferred access points utilize a first type of modulation when communicating signals, and the non-preferred access points utilize a second type of modulation when communicating signals that is different that the first type of modulation. Here, a modulation selection preference setting (AP_mod_sel_pref) can be used to specify that selection of an OFDM AP (e.g., an AP that modulates its signals using OFDM) is preferred over a DSSS AP (e.g., an AP that modulates its signals using DSSS), or vice-versa. In another illustrative implementation, the preferred access points have a first set of data rates available, and the non-preferred access points have a second set of data rates available that are lower than the first set of data rates. An AP selection preference setting (AP_DR_sel_pref) can be used to specify that selection of a high data-rate AP (e.g., an IEEE 802.11n compliant AP) is preferred over a lower data-rate AP (e.g., an IEEE 802.11b/g compliant AP), or vice-versa.

The merged candidate list is a candidate list that includes APs in both the PCL and the NPSCL.

As will be described below, the method 300 can be used to prefer certain types of APs as a serving AP over other types of APs when roaming among a network of APs.

The wireless communication device 160 can perform scanning when a roaming trigger event occurs. The roaming trigger event varies depending on the particular implementation. Examples of roaming trigger events include (1) expiration of a timer, (2) observing changes in link quality (e.g., decrease in RSSI or Received Channel Power Indicator (RCPI), a number of missed beacon frames, an increased percentage of unacknowledged packets and/or retransmission of packets). Prior to method 300, the wireless communication device 160 performs a "learning" scan to determine which APs 150, 154 it is receiving a signal from and thus learn which APs 150, 154 are within its communication range. More specifically, when the wireless communication device 160 determines that a roaming trigger event has occurred, the wireless communication device 160 scans for beacon frames (or "performs a learning scan"), either passively and/or actively, to detect APs within communication range of wireless communication device 160. The wireless communication device 160 uses the learning scan to create an overall candidate list (OCL). At the end of a scanning interval, the wireless communication device 160 generates a scan report that includes information for each of the detected APs. This information includes received signal strength (RSSI) (e.g., a measure of the received RF power in a selected channel over the preamble) or Received Channel Power Indicator (RCPI) (e.g., a measure of the received RF power in a selected channel over the preamble and the entire received 802.11 frame), missed probe responses for active scans, age of the AP (e.g., how long since that AP has been observed in a scan), the channel/frequency of the AP, etc. The wireless communication device 160 maintains a count of the number of missed probe responses to track when an AP in the KAPDB fails to respond to probe request (which may include an SSID) sent by the wireless communication device 160 during active scanning.

Method 300 then begins at step 305 when the wireless communication device 160 completes its learning scan. At step 310, the wireless communication device 160 determines whether its AP band selection preference setting (AP_band_sel_pref) is set to none. The AP band selection preference setting (AP_band_sel_pref) is used to specify whether selection of an AP that communicates over a particular frequency band is preferred over APs that communicate over other frequency bands. For example, in one embodiment, the AP band selection preference setting (AP_band_sel_pref) can be used to specify that selection of a high frequency AP is preferred over a low frequency AP, or vice-versa. For instance, in one implementation of this embodiment, the AP band selection preference setting (AP_band_sel_pref) can be used to specify that selection of a high frequency AP (e.g., an IEEE 802.11a compliant AP that communicates over a 5.4 GHz frequency band) is preferred over a low frequency AP (e.g., an IEEE 802.11b/g compliant AP that communicates over a 2.4 GHz frequency band), or vice-versa.

When the wireless communication device 160 determines that its AP band selection preference setting (AP_band_sel_pref) is set to none at step 310, the AP band selection preference setting is disabled and no APs are preferred over other APs on the basis of their operating frequency band. Accordingly, the method 300 proceeds to step 320, where the wireless communication device 160 executes a roaming decision algorithm based on the OCL. In one implementation, this can involve steps such as sorting the OCL based on the signal strength indicator value associated with each AP in the OCL, evaluating the sorted OCL to determine which AP in the OCL has the best/highest signal strength indicator value, and selecting the AP having the best/highest signal strength indicator value as its new serving AP. The APs are sorted according to signal strength indicator values in descending order with the AP having the best/highest signal strength indicator value at the top of the OCL and with the AP having the worst/lowest signal strength indicator value at the bottom of the OCL. In one implementation, the roaming decision algorithm can be performed in accordance with the steps that are described below with reference to FIG. 5.

When the wireless communication device 160 determines that its AP band selection preference setting (AP_band_sel_pref) is set (e.g., is not set to none) at step 310, selection of an AP that communicates over a particular frequency band is preferred over APs that communicate over other frequency bands. For example, in one embodiment, selection of a high frequency AP is preferred over a low frequency AP, or vice-versa. The method 300 proceeds to step 325, where the wireless communication device 160 sorts the candidate list based on the signal strength indicator values associated with each AP in the candidate list, and identifies/selects the preferred AP that has the highest signal strength indicator value for further evaluation at steps 330 and 365 (described below). Method 300 then proceeds to step 330, where the wireless communication device 160 determines whether the AP selected at step 325 has an signal strength indicator value greater than a high threshold (e.g., −65 dBm) that serves as an upper limit that triggers the AP selection preference to an on-state.

When the wireless communication device 160 determines that the AP (selected at step 325) does have a signal strength indicator value greater than the high threshold (e.g., −65 dBm), the method proceeds to step 335 where the selection preference mode (pref_mode) is set to true to indicate that the AP selection preference is in an on-state. The method 300 then proceeds to step 340. At step 340 the wireless communication device 160 creates a preferred candidate list (PCL). Again, the PCL includes only the preferred APs that communicate over the particular preferred frequency band that is defined by or specified in the band selection preference setting (band_sel_pref)).

The method 300 then proceeds to step 342. At step 342, the wireless communication device 160 determines whether its current serving AP is a preferred AP. For example, in one implementation of step 342, the wireless communication device 160 determines whether the frequency band of its current serving AP matches the particular preferred frequency band specified in the AP band selection preference setting (AP_band_sel_pref). In this regard, it is noted that the current serving AP does not necessarily have to be in the PCL, but just needs to be a preferred AP. When the wireless communication device 160 determines that its current serving AP is a preferred AP (e.g., the frequency band of its current serving AP matches the particular preferred frequency band specified in the AP band selection preference setting (AP_band_sel_pref)), the method 300 proceeds to step 345, where the wireless communication device 160 executes a roaming decision algorithm based on the PCL. In one implementation, this can involve steps such as sorting the PCL based on the signal strength indicator values associated with each AP in the PCL, evaluating the sorted PCL to determine which AP in the PCL has the best/highest signal strength indicator value, and selecting the AP having the best/highest signal strength indicator value as its new serving AP. This preferred candidate list includes only the APs that communicate over the particular preferred frequency band (which are indicated in the band selection preference setting (band_sel_pref)). In one implementation, the roaming decision algorithm can be performed in accordance with the steps that are described below with reference to FIG. 5.

The method 300 proceeds to step 350, where the wireless communication device 160 creates a non-preferred side candidate list (NPSCL) based on the signal strength indicator values associated with each non-preferred AP in the non-preferred frequency band (e.g., APs which do not communicate using the particular preferred frequency band indicated in the band selection preference setting (band_sel_pref)). The method 300 then ends at step 398.

When the wireless communication device 160 determines that its current serving AP is not a preferred AP (e.g., the frequency band of its current serving AP does not match the particular preferred frequency band specified in the AP band selection preference setting (AP_band_sel_pref)), the method 300 proceeds to step 344, where the wireless communication device 160 initiates a roam to the preferred AP that has the strongest signal strength (e.g., RSSI value) as determined at step 325. Although not illustrated, the wireless communication device exchanges messages necessary to establish a connection with and handoff to this preferred AP as its new serving AP. The message exchange used can be any known message exchange including that specified by the IEEE 802.11r standard. For example, in one implementation, the wireless communication device 160 initiates a roam to the desired AP by sending an IEEE 802.11 authentication packet to begin IEEE 802.11 authentication process, and the desired AP responds with an IEEE 802.11 authentication packet. Then, to being the IEEE 802.11 association process, the wireless communication device 160 then sends an IEEE 802.11 association request packet. The method 300 then ends at step 398.

When the wireless communication device 160 determines that the AP (selected at step 325) does not have an signal strength indicator value greater than the high threshold (e.g., −65 dBm), the method proceeds to step 360 where the wireless communication device 160 determines whether the selection preference mode (pref_mode) is set to true to determine whether the AP selection preference is in an on-state or an off-state.

When the wireless communication device 160 determines that the selection preference mode (pref_mode) is set to false (at step 360), the AP selection preference is in an off-state, and the method 300 proceeds to step 380, where the wireless communication device 160 executes a roaming decision algorithm based on the OCL. In one implementation, this can involve steps such as sorting the OCL based on the signal strength indicator value associated with each AP in the OCL, evaluating the sorted OCL to determine which AP in the OCL has the best/highest signal strength indicator value, and selecting the AP having the best/highest signal strength indicator value as its new serving AP. In one implementation, the roaming decision algorithm can be performed in accordance with the steps that are described below with reference to FIG. 5.

When the wireless communication device 160 determines that the selection preference mode (pref_mode) is set to true (at step 360), the AP selection preference is in an on-state, and the method 300 proceeds to step 365, where the wireless communication device 160 determines whether the AP from the PCL that has the strongest signal strength indicator has an signal strength indicator value less than a low threshold (e.g., −70 dBm) that serves as a lower limit that triggers the AP selection preference to an off-state. When the wireless communication device 160 determines at step 365 that the AP (determined at step 365) has an signal strength indicator value less than the low threshold (e.g., −70 dBm), the method proceeds to step 370, where the selection preference mode (pref_mode) is set to false to indicate that the AP selection preference is in an off-state. The method 300 then proceeds to step 375, where the wireless communication device 160 merges a preferred candidate list (PCL) that includes only the preferred APs that communicate over the particular preferred frequency band with the non-preferred side candidate list (NPSCL) that includes the non-preferred APs in the non-preferred frequency band (e.g., APs which do not communicate using the particular preferred frequency band) to create a merged candidate list (MCL). The method 300 then proceeds to step 377 where the wireless communication device 160 executes a roaming decision algorithm based on the MCL. In one implementation, this can involve steps such as sorting the MCL based on the signal strength indicator value associated with each AP in the MCL, evaluating the sorted MCL to determine which AP in the MCL has the best/highest signal strength indicator value, and selecting the AP having the best/highest signal strength indicator value as its new serving AP. In one implementation, the roaming decision algorithm can be performed in accordance with the steps that are described below with reference to FIG. 5. The method 300 then ends at step 398.

When the wireless communication device 160 determines at step 365 that the AP (selected at step 325) has a signal strength indicator value greater than or equal to the low threshold (e.g., −70 dBm), the method proceeds to step 385, where the wireless communication device 160 creates a preferred candidate list (PCL) that includes only the APs that communicate over the particular preferred frequency band (which are indicated in the band selection preference setting (band_sel_pref)). The method 300 proceeds to step 390, where the wireless communication device 160 executes a roaming decision algorithm based on the PCL. In one implementation, this can involve steps such as sorting the PCL based on the signal strength indicator values associated with each AP in the PCL, evaluating the sorted PCL to determine which AP in the PCL has the best/highest signal strength indicator value, and selecting the AP having the best/highest signal strength indicator value as its new serving AP. In one implementation, the roaming decision algorithm can be performed in accordance with the steps that are described below with reference to FIG. 5.

The method 300 proceeds to step 395, where the wireless communication device 160 creates a non-preferred side candidate list (NPSCL) based on the signal strength indicator values associated with each AP in the non-preferred frequency band (e.g., APs which do not communicate using the particular preferred frequency band indicated in the band selection preference setting (band_sel_pref)). For example, in one embodiment, when the band selection preference setting (band_sel_pref) indicates that selection of a high frequency AP (e.g., an IEEE 802.11a compliant AP that communicates over a 5.0 GHz frequency band) is preferred over a low frequency APs (e.g., an IEEE 802.11b/g compliant AP that communicates over a 2.4 GHz frequency band), the high-frequency APs will be included in the PCL, and the low frequency APs (or a subset thereof) will be included in the NPSCL. The method 300 then ends at step 398.

Figure 4:
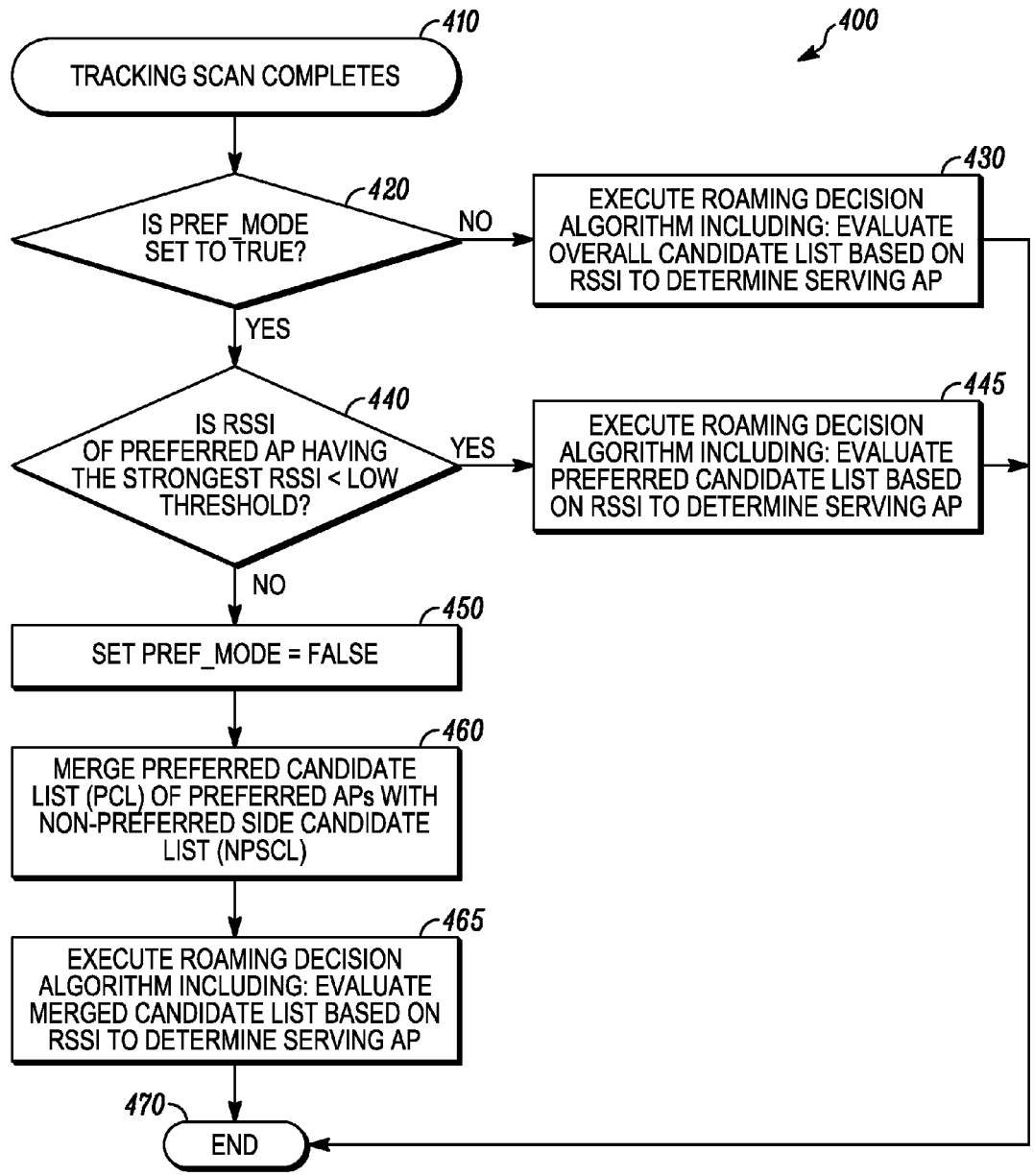
FIG. 4 is a flow chart of another method for determining, at a wireless communication device following a tracking scan, which candidate list is to be used for selective roaming to a preferred AP in accordance with some of the other disclosed embodiments.

FIG. 4 is a flow chart of another method 400 for determining, at a wireless communication device 160 following a tracking scan, which candidate list is to be used for selective roaming to a preferred AP in accordance with some of the other disclosed embodiments. Method 400 can be implemented after candidate lists have been created via method 300 of FIG. 3 and following a tracking scan at the wireless communication device 160.

Method 400 begins at step 410, when the wireless communication device 160 completes a tracking scan and has measured signal strength indicator values of signals from AP in its overall candidate list (including its current serving AP and any other candidate APs in the overall candidate list (OCL)).

Method 400 then proceeds to step 420, where the wireless communication device 160 determines whether the selection preference mode (pref_mode) is set to true/false to determine whether the AP selection preference is in an on-state or an off-state.

When the wireless communication device 160 determines that the selection preference mode (pref_mode) is set to false (at step 420), the AP selection preference is in an off-state, and the method 400 proceeds to step 430, where the wireless communication device 160 performs processing similar to that described above with respect to step 320. The method 400 then ends at step 470.

When the wireless communication device 160 determines that the selection preference mode (pref_mode) is set to true (at step 420), the AP selection preference is in an on-state, and the method 400 proceeds to step 440, where the wireless communication device 160 determines which AP from the preferred candidate list (PCL) has the best/highest signal strength indicator value, and then determines whether that best/highest signal strength indicator value is less than a low threshold (e.g., −70 dBm). This low threshold serves as a lower limit that if not exceeded triggers the AP selection preference into an off-state.

When the wireless communication device 160 determines at step 440 that the best/highest signal strength indicator value is less than the low threshold (e.g., −70 dBm), the method proceeds to step 450, where the selection preference mode (pref_mode) is set to false to indicate that the AP selection preference is in an off-state. The method 400 then proceeds to step 460, where the wireless communication device 160 merges a preferred candidate list (PCL) that includes only the APs that communicate over the particular preferred frequency band with a non-preferred side candidate list (NP-SCL) that includes each AP in the non-preferred frequency band (e.g., APs which do not communicate using the particular preferred frequency band) to create a merged candidate list (MCL). The method 400 then proceeds to step 465 where the wireless communication device 160 performs processing similar to that described above with respect to step 377. The method 400 then ends at step 470.

When the wireless communication device 160 determines at step 440 that the best/highest signal strength indicator value is greater than or equal to the low threshold (e.g., −70 dBm), the AP selection preference is in an on-state and the method proceeds to step 445, where the wireless communication device 160 performs (at 445) processing similar to that described above with respect to step 345. The method 400 then ends at step 470.

Figure 5:
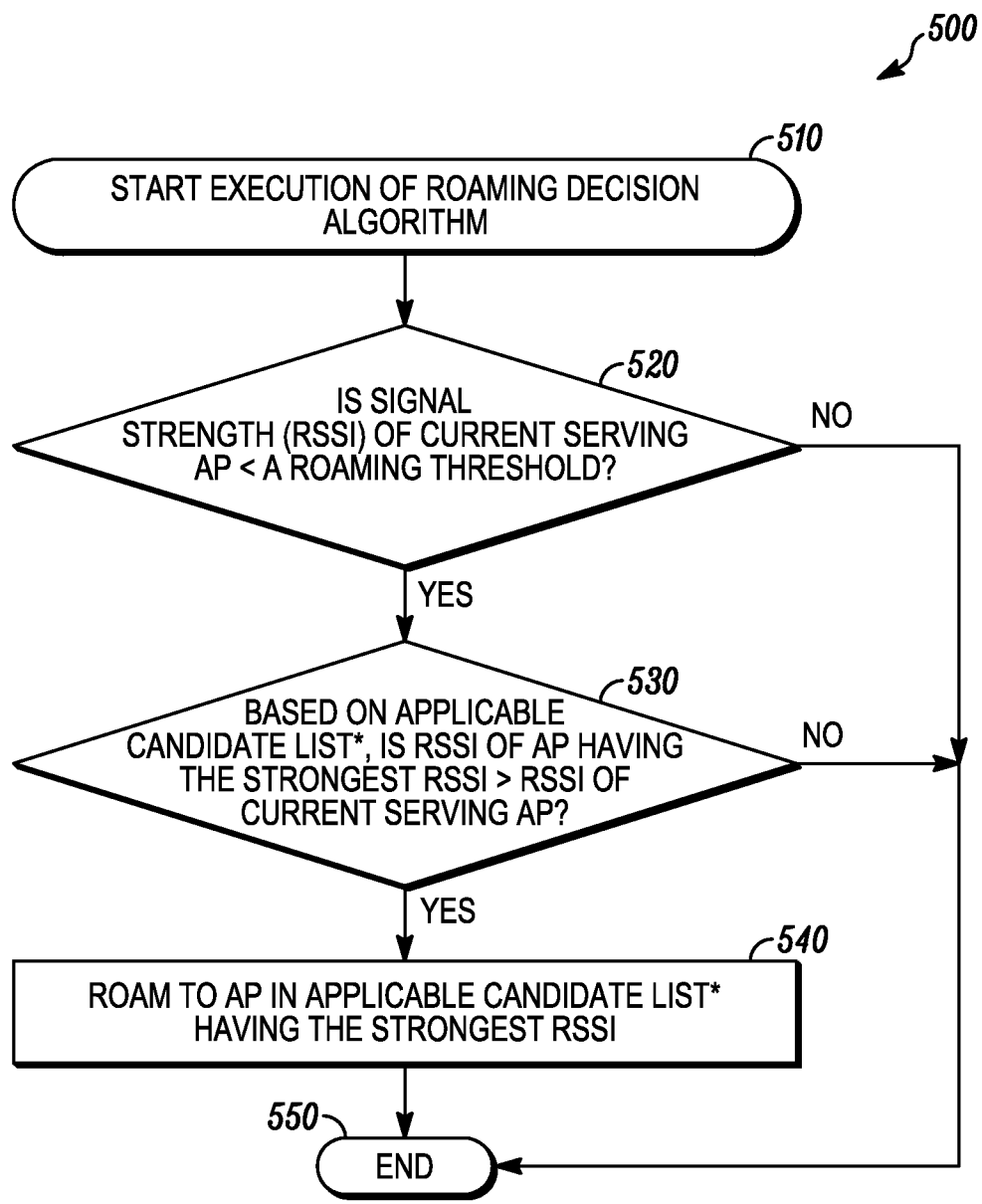
FIG. 5 is a flow chart of a roaming method implemented at a wireless communication device in accordance with some of the disclosed embodiments.

FIG. 5 is a flow chart of a roaming method 500 implemented at a wireless communication device 160 in accordance with some of the disclosed embodiments. Method 500 can be applied using (1) the overall candidate list (e.g., at steps 320, 380, 430); (2) the preferred candidate list (PCL) (e.g., at steps 345, 392, 445); or (3) a merged candidate list that is a combination of the PCL and a non-preferred side candidate list (NPSCL) (e.g., at steps 377 or 465).

Method 500 begins at step 510 where execution of the roaming decision algorithm starts, and proceeds to step 520, where the wireless communication device 160 determines whether the signal strength (e.g., as indicated by an signal strength indicator) of its current serving AP is less than a roaming threshold.

When the signal strength of its current serving AP is determined to be greater than or equal to the roaming threshold the method 500 ends at step 550. By contrast, when the wireless communication device 160 determines that the signal strength of its current serving AP is less than a roaming threshold, the method 500 proceeds to step 530, where the wireless communication device determines, based on the applicable candidate list, whether the signal strength of the AP (in the applicable candidate list) that has the best/highest signal strength is greater than the signal strength (e.g., as indicated by an signal strength indicator) of its current serving AP.

When the signal strength of the AP (in the applicable candidate list) that has the best/highest signal strength is determined to be less than or equal to the signal strength of its current serving AP, the method 500 ends at step 550. By contrast, when the wireless communication device 160 determines that the signal strength of the AP (in the applicable candidate list) that has the best/highest signal strength is greater than the signal strength of its current serving AP, the method 500 proceeds to step 530, where the wireless communication device 160 roams to the AP (in the applicable candidate list) that has the best/highest signal strength (e.g., highest signal strength indicator). The method 500 then ends at step 550.

FIGS. 6-8 illustrate non-limiting examples of an overall candidate list (OCL) (FIG. 6), a preferred candidate list (PCL) (FIG. 7), and a non-preferred side candidate list (NP-SCL) (FIG. 8) that could be generated in the network if FIG. 1. For purposes of the following discussion, it is assumed that AP1 150-1, AP2 154-1, AP3 150-2, AP4 150-6, AP5 150-5, AP6 154-2 and AP7 150-4 of FIG. 1 are within communication range of the wireless communication device 160 (e.g., that the wireless communication device 160 receives a decodable signal from those APs). AP1 150-1, AP2 154-1, AP3 150-2, AP4 150-6, AP5 150-5, AP6 154-2 and AP7 150-4 are detected during scanning an added to the overall candidate list (OCL) (FIG. 6). All of these APs except AP6 154-2 have adequate RSSI values to be added to either the preferred candidate list (PCL) of FIG. 7 or the non-preferred side candidate list (NPSCL) of FIG. 8. In this example, AP2 154-1 is added to the non-preferred side candidate list (NPSCL) of FIG. 8 since it is a low-frequency AP, and AP1 150-1, AP2 154-1, AP4 150-6, AP5 150-5, AP6 154-2 are added to the preferred candidate list (PCL) of FIG. 7 since they are high-frequency APs. AP1 150-1, AP2 154-1, AP4 150-6, AP5 150-5, AP6 154-2 are ranked based on their corresponding RSSI values with AP1 150-1 having the highest ranking since its RSSI value is −73 dBm. In accordance with the disclosed embodiments, AP1 150-1 will be selected as the serving AP for the wireless communication device 160 even though its RSSI value is lower than that of low frequency AP2 154-1.

Figure 9:
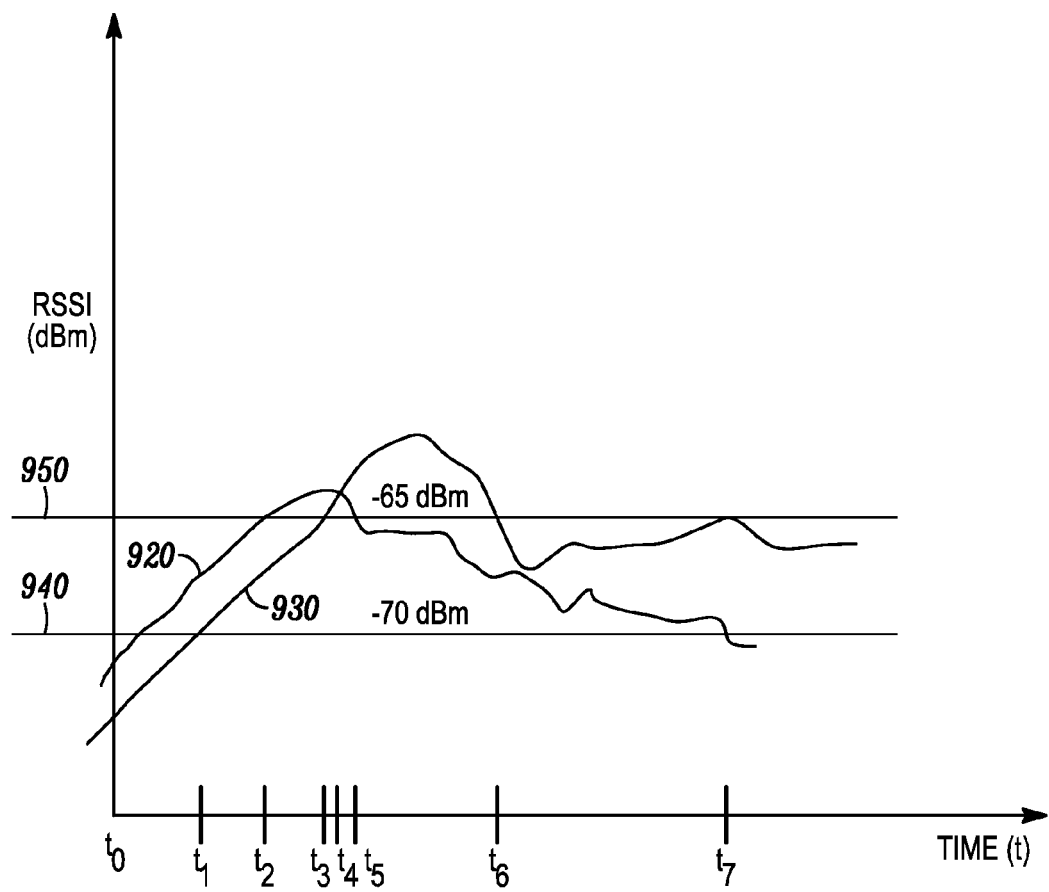
FIG. 9 is a graph that illustrates RSSI curves for two access points (APs) along with a low threshold that serves as a lower limit that triggers an AP selection preference to an off-state and a high threshold that triggers the AP selection preference to an on-state.

FIG. 9 is a graph that illustrates RSSI curves 920, 930 for two APs along with a low threshold 940 (e.g., −70 dBm) that serves as a lower limit that triggers the AP selection preference to an off-state and a high threshold 950 (e.g., −65 dBm) that serves as an upper limit that triggers the AP selection preference to an on-state. RSSI curve 920 is that of a high-frequency AP (e.g., an IEEE 802.11a compliant AP), whereas RSSI curve 930 is that of a low-frequency AP (e.g., an IEEE 802.11bg compliant AP).

At time t0, the RSSI curve 920 of the high-frequency AP has a greater value than the RSSI curve 930 of the low-frequency AP. The RSSI curve 920 of the high-frequency AP has a greater value than the RSSI curve 930 of the low-frequency AP until time t3 after which the RSSI curve 930 of the low-frequency has a greater value than the RSSI curve 920 of the high-frequency AP.

At time t2, the value of the RSSI curve 920 of the high-frequency AP exceeds the high threshold 950 (e.g., −65 dBm) that serves as an upper limit that triggers the AP selection preference to an on-state. When the value of the RSSI curve 920 of the high-frequency AP exceeds the high threshold 950 (e.g., −65 dBm) (during the time interval between time t2 and t6) the AP selection preference is on and the high frequency AP will be "preferred" over the low frequency AP even though the low frequency AP may have a greater RSSI value (e.g., during the time interval between time t4 and t5).

The value of the RSSI curve 920 of the high-frequency AP is less than the value of the RSSI curve 930 of the low-frequency AP after t4; however, the high frequency AP will still be selected with a preference over the low frequency AP since the value of the RSSI curve 920 exceeds the high threshold 950 (e.g., −65 dBm). After time t5, the value of the RSSI curve 920 of the high-frequency AP is less than the high threshold 950 (e.g., −65 dBm) however the AP selection preference will remain in an on-state until time t6 when the value of the RSSI curve 920 of the high-frequency AP is less than the low threshold 940 (e.g., −70 dBm) that serves as a lower limit that triggers the AP selection preference to an off-state. When the AP selection preference is in the off-state the wireless communication device can select the low-frequency AP as its serving AP since it has a high RSSI value.

While at least one illustrative embodiment has been presented in the foregoing detailed description of the invention, it should be appreciated that a vast number of variations exist. It should also be appreciated that the illustrative embodiment or illustrative embodiments are only examples, and are not intended to limit the scope, applicability, or configuration of the invention in any way. One of ordinary skill in the art appreciates that various modifications and changes can be made without departing from the scope of the invention as set forth in the claims below. As such, the foregoing detailed description will provide those skilled in the art with a convenient road map for implementing an embodiment of the invention, it being understood that various changes may be made in the function and arrangement of elements described in an embodiment without departing from the scope of the invention as set forth in the appended claims and their legal equivalents. Accordingly, the specification and figures are to be regarded in an illustrative rather than a restrictive sense, and all such modifications are intended to be included within the scope of present teachings. In addition, the benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in an IEEE 802.11 communication system for selecting an access point to roam to from a plurality of access points that include a first type of preferred access points and a second type of non-preferred access points, the method comprising:

scanning for access points within communication range of a wireless communication device and recording link quality metrics for each access point that is detected during scanning in an overall candidate list, and when scanning is complete;

determining if a particular link quality metric of a particular access point in the overall candidate list that has the highest link quality metric is greater than a high link quality metric threshold; whereupon creating a preferred candidate list that comprises only preferred access points when the particular link quality metric is determined to be greater than the high link quality metric threshold;

determining whether a current serving access point of the wireless communication device is a preferred access point; and initiating, at the wireless communication device when the current serving access point for the wireless communication device is not a preferred access point, a roam to the particular preferred access point that has the largest link quality metric, and if the particular link quality metric is determined to be less than or equal to the high link quality metric threshold, determining whether a selection preference mode is in an on-state or an off-state; whereupon determining, when the selection preference mode is determined to be in the on-state, whether the link quality metric of the preferred access point in the preferred candidate list that has the largest link quality metric is less than a low link quality metric threshold;

setting a selection preference mode to indicate that access point selection preference is in an off-state when the link quality metric of the preferred access point in the preferred candidate list that has the largest link quality metric is less than a low link quality metric threshold;

creating the preferred candidate list that comprises only preferred access points when the link quality metric of the preferred access point in the preferred candidate list that has the largest link quality metric is less than a low link quality metric threshold; and executing, at the wireless communication device, a roaming decision algorithm based on the preferred candidate list.

2. A method according to claim 1, further comprising:
setting a selection preference mode to an on-state to indicate an access point selection preference when the particular link quality metric is greater than the high link quality metric threshold.

3. A method according to claim 1, wherein if the particular link quality metric is determined to be greater than the high link quality metric threshold, further comprising:
executing, at the wireless communication device, a roaming decision algorithm based on the preferred candidate list when the current serving access point of the wireless communication device is a preferred access point.

4. A method according to claim 3, further comprising:
creating a non-preferred side candidate list comprising at least some of the non-preferred access points detected during scanning.

5. A method according to claim 3, wherein the step of executing a roaming decision algorithm, comprises:
sorting the preferred candidate list based on the link quality metrics associated with each access point in the preferred candidate list;

determining which preferred access point in the sorted preferred candidate list has the largest link quality metric; and selecting the preferred access point having the largest link quality metric as a new serving access point for the wireless communication device.

6. A method according to claim 3, wherein the step of executing a roaming decision algorithm, comprises:
determining, at the wireless communication device, whether a link quality metric of the current serving access point for the wireless communication device is less than a roaming link quality metric threshold;

determining, at the wireless communication device based on the preferred candidate list when the link quality metric of the current serving access point is determined to be less than the roaming link quality metric threshold, whether the link quality metric of the preferred access point in the preferred candidate list that has the largest link quality metric is greater than the link quality metric of the current serving access point; and initiating a roam to the preferred access point that has the largest link quality metric, when the wireless communication device determines that the link quality metric of the access point in the preferred candidate list that has the largest link quality metric is greater than the link quality metric of the current serving access point.

7. A method according to claim 1, wherein if the particular link quality metric is determined to be less than or equal to the high link quality metric threshold, further comprising:
creating a non-preferred side candidate list comprising at least some of the non-preferred access points detected during scanning.

8. A method according to claim 1, wherein if the particular link quality metric is determined to be less than or equal to the high link quality metric threshold, the step of executing a roaming decision algorithm comprises:
sorting the preferred candidate list based on the link quality metrics associated with each access point in the preferred candidate list;

determining which preferred access point in the sorted preferred candidate list has the largest link quality metric; and selecting the preferred access point having the largest link quality metric as a new serving access point for the wireless communication device.

9. A method according to claim 1, wherein if the particular link quality metric is determined to be less than or equal to the high link quality metric threshold, the step of executing a roaming decision algorithm, comprises:
determining whether a link quality metric of the current serving access point for the wireless communication device is less than a roaming link quality metric threshold;

determining, based on the preferred candidate list when the link quality metric of the current serving access point is determined to be less than the roaming link quality metric threshold, whether the link quality metric of the preferred access point in the preferred candidate list that has the largest link quality metric is greater than the link quality metric of the current serving access point; and initiating a roam to the preferred access point that has the largest link quality metric, when the wireless communication device determines that the link quality metric of the access point in the preferred candidate list that has the largest link quality metric is greater than the link quality metric of the current serving access point.

10. A method according to claim 1, further comprising:
scanning for access points in an overall candidate list that are within communication range of the wireless communication device and recording link quality metrics for each access point that is in the overall candidate list and is detected during scanning.

11. A method according to claim 10, further comprising:
determining, at the wireless communication device, whether the selection preference mode is set to indicate either an on-state or an off-state;
determining, at the wireless communication device when the wireless communication device determines that the selection preference mode is set to indicate the on-state, whether a first link quality metric of the preferred access point from the preferred candidate list that has the largest link quality metric is less than a low link quality metric threshold;
determining, at the wireless communication device, whether a link quality metric of the current serving access point for the wireless communication device is less than a roaming link quality metric threshold;
determining, at the wireless communication device based on the preferred candidate list when the link quality metric of the current serving access point is determined to be less than the roaming link quality metric threshold, whether the link quality metric of the preferred access point in the preferred candidate list that has the largest link quality metric is greater than the link quality metric of the current serving access point; and
initiating a roam to the preferred access point that has the largest link quality metric, when the wireless communication device determines that the link quality metric of the access point in the preferred candidate list that has the largest link quality metric is greater than the link quality metric of the current serving access point.

12. A method according to claim 11, when the first link quality metric of the preferred access point from the preferred candidate list that has the largest link quality metric is greater than or equal to the low link quality metric threshold, further comprising:
setting a selection preference mode to an off-state to indicate that there is no access point selection preference.

13. A method according to claim 1, wherein the first type of preferred access points comprise low-frequency access points, and wherein the second type of non-preferred access points comprise high-frequency access points.

14. A method according to claim 1, wherein the first type of preferred access points comprise high-frequency access points, and wherein the second type of non-preferred access points comprise low-frequency access points.

15. A method according to claim 1, wherein the first type of preferred access points have a first set of data rates available, and wherein the second type of non-preferred access points have a second set of data rates available that are lower than the first set of data rates.

16. A method according to claim 1, wherein the first type of preferred access points utilize a first type of modulation when communicating signals, and wherein the second type of non-preferred access points utilize a second type of modulation when communicating signals that is different that the first type of modulation.

17. A method according to claim 1, further comprising:
when the particular link quality metric is determined to be greater than the high link quality metric threshold, creating a preferred candidate list that comprises only preferred access points that communicate over a particular preferred frequency band that is specified in a band selection preference setting and a non-preferred side candidate list that comprises non-preferred access points that do not communicate using the particular preferred frequency.

18. A wireless communication device operable in an IEEE 802.11 communication system, the wireless communication device, comprising:
a memory module;
an RF module comprising a transmitter and a receiver; and
a processor coupled to the RF module, wherein the processor is designed to operate in conjunction with the RF module to scan for access points within communication range of the wireless communication device and to record link quality metrics for each access point that is detected during scanning in an overall candidate list stored in the memory module, and when the processor completes scanning, wherein the processor is further designed to determine if a particular link quality metric of a particular access point in the overall candidate list that has the highest link quality metric is greater than a high link quality metric threshold; whereupon the processor is operable to:
create a preferred candidate list that is stored at the memory module when the particular link quality metric is determined to be greater than the high link quality metric threshold, wherein the preferred candidate list comprises only preferred access points and excludes non-preferred access points;
determine whether a current serving access point of the wireless communication device is a preferred access point; and
generate a roam message that is destined for the particular preferred access point that has the largest link quality metric when the current serving access point for the wireless communication device is not a preferred access point, and
if the particular link quality metric is determined by the processor to be less than or equal to the high link quality metric threshold, the processor is operable to determine whether a selection preference mode is in an on-state or an off-state; whereupon the processor:
determines when the selection preference mode is determined to be in the on-state, whether the link quality metric of the preferred access point in the preferred candidate list that has the largest link quality metric is less than a low link quality metric threshold;
sets a selection preference mode to indicate that access point selection preference is in an off-state when the link quality metric of the preferred access point in the preferred candidate list that has the largest link quality metric is less than a low link quality metric threshold;
create the preferred candidate list that comprises only preferred access points when the link quality metric of the preferred access point in the preferred candidate list that has the largest link quality metric is less than a low link quality metric threshold; and
executes a roaming decision algorithm based on the preferred candidate list.

* * * * *